(12) United States Patent
Geller et al.

(10) Patent No.: US 10,110,736 B2
(45) Date of Patent: Oct. 23, 2018

(54) SYSTEM AND METHOD FOR IMPLEMENTING SMS TEXTING AS A CUSTOMER SERVICE CHANNEL

(71) Applicant: JPMorgan Chase Bank, N.A., New York, NY (US)

(72) Inventors: Michael Geller, Brooklyn, NY (US); Richard H. Hogrogian, Cherry Hill, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 15/730,801

(22) Filed: Oct. 12, 2017

(65) Prior Publication Data

US 2018/0041634 A1    Feb. 8, 2018

Related U.S. Application Data

(63) Continuation of application No. 15/228,266, filed on Aug. 4, 2016, now Pat. No. 9,819,968.

(51) Int. Cl.
| | |
|---|---|
| *H04M 3/42* | (2006.01) |
| *H04W 4/14* | (2009.01) |
| *H04L 12/58* | (2006.01) |
| *H04M 3/51* | (2006.01) |
| *H04M 7/00* | (2006.01) |

(52) U.S. Cl.
CPC ...... *H04M 3/42382* (2013.01); *H04L 51/046* (2013.01); *H04L 51/14* (2013.01); *H04L 51/32* (2013.01); *H04L 51/38* (2013.01); *H04M 3/51* (2013.01); *H04M 7/0048* (2013.01); *H04W 4/14* (2013.01); *H05K 999/99* (2013.01)

(58) Field of Classification Search
CPC ...... H04M 3/42382; H04L 51/22; H04W 4/14
See application file for complete search history.

(56) References Cited

U.S. PATENT DOCUMENTS

| | | | |
|---|---|---|---|
| 9,232,373 B1* | 1/2016 | Caldwell | H04W 4/14 |
| 9,532,197 B1* | 12/2016 | Lew | H04W 4/14 |
| 2003/0185379 A1* | 10/2003 | O'Connor | H04L 12/5855 |
| | | | 379/265.02 |
| 2008/0192923 A1* | 8/2008 | Ruckart | H04M 3/5231 |
| | | | 379/265.09 |
| 2009/0186634 A1* | 7/2009 | Sureka | H04W 4/14 |
| | | | 455/466 |

(Continued)

*Primary Examiner* — Nathan Mitchell
(74) *Attorney, Agent, or Firm* — LeClairRyan PLLC (57) ABSTRACT

Embodiments of the invention are directed to the integration of SMS texting into a social media platform for providing customer service support. A method of the invention includes maintaining a registration of a handler system with a text hub, wherein the text hub intercepts text messages forwarded through a mobile carrier to the dedicated customer service landline. The method further includes receiving at the registered handler system a text message directed to the dedicated landline. The method further includes calling a routing engine for forwarding the text message to a customer service platform and receiving a response to the text message formulated at the customer service platform at the processor. The method further includes transmitting the response from the processor in the form of a text message to the text hub for delivery by the mobile carrier to the mobile device.

20 Claims, 7 Drawing Sheets

(56) References Cited

U.S. PATENT DOCUMENTS

| | | | |
|---|---|---|---|
| 2010/0004007 A1* | 1/2010 | Vogel | H04L 12/5895 |
| | | | 455/466 |
| 2010/0124905 A1* | 5/2010 | Pratt | H04L 51/14 |
| | | | 455/412.1 |
| 2013/0129075 A1* | 5/2013 | Whitaker | H04M 3/523 |
| | | | 379/265.09 |
| 2013/0196697 A1* | 8/2013 | Lew | H04W 4/14 |
| | | | 455/466 |
| 2016/0330144 A1* | 11/2016 | Dymetman | H04L 51/02 |

* cited by examiner

SYSTEM AND METHOD FOR IMPLEMENTING SMS TEXTING AS A CUSTOMER SERVICE CHANNEL

RELATED APPLICATIONS

This application is a continuation application of U.S. patent application Ser. No. 15/228,266, filed on Aug. 4, 2016.

FIELD OF THE INVENTION

Embodiments of the present invention are generally related to systems and methods for integrating short message service (SMS) texting as a customer service channel and in particular to handling text messages directed to a customer service landline.

BACKGROUND OF THE INVENTION

Traditionally, in order to obtain customer service, customers of large organizations have called a customer service help line, which is typically a landline staffed by an automated system, one or more employees, or a combination of the two. These customer service lines typically involve a waiting time during which customers are required to remain on the line to receive assistance. Often, customers are unwilling or unable to find a block of time sufficient to utilize an automated customer service line.

Online chat has also become a popular customer service option. However, online chat typically offers less functionality than the customer service help lines and personnel are often only able to answer questions and cannot accommodate change requests or other types of requests related to customer orders. Furthermore, customers must reserve a block of time and remain engaged for online chat.

Email addresses provided for customer service are typically inadequately monitored and often emails forwarded to customer service addresses remain unanswered for forty eight hours or more. Additionally, emails to customer service often result in return emails asking customers to contact the customer service help lines.

With the popularization of smartphones, tablets and other mobile devices, mobile applications, or "apps," have become household terms. Apps are computer applications that execute on mobile devices. Like applications that execute on traditional computing devices, apps allow users to perform a wide range of actions, from simple (e.g., access the Internet, take a photo) to specialized (e.g., file tax forms, play a board game). Many businesses now provide mobile apps to their customers. While these apps may be utilized for customer service, application development and delivery professionals face a distinct challenge serving the increasingly mobile customer. Persuading customers to download, install, and regularly use mobile applications is a challenge.

With the continued rise of smartphone technology, SMS texting has emerged as a communication medium of choice for modern consumers. Texting encourages concise communication with its small message-size limit. Because texting is asynchronous, the process of exchanging texts does not involve wasted time. Customers are able to focus on other tasks while awaiting a response. Out of customer frustration with other available inadequate modes of customer service access, customers frequently send an SMS text to a customer service number. Because the customer service numbers are generally tied to landlines, business personnel do not receive these texts.

Customers need a fast, efficient way to get help from companies with whom they do business. The pervasiveness and familiarity of text messaging makes it an ideal channel to win, serve, and retain customers who require assistance from a contact center agent. With respect to certain businesses, such as banking, customers have easy access to customer service telephone numbers. For example, banking customers frequently carry debit and credit cards with toll free contact numbers on them. However, these toll free numbers are for landline phones that do not support texting.

Accordingly, a solution is needed that will allow mobile users to employ SMS texting as an efficient customer service channel using existing toll free numbers. Further, a solution is needed that will transport SMS texts sent to toll free numbers to a customer support platform. Additionally, a solution is needed that will chain and route multiple text interactions from the same customer to achieve continuity in customer service. Furthermore, a secure solution is needed that will ensure that the customer is properly authenticated for text messaging and that the text message servicing is secure or escalate to a more secure channel when the security of text servicing is insufficient for the needs of the customer with respect to the particular customer service request.

SUMMARY OF THE INVENTION

Embodiments of the invention are directed to incorporating text messages directed to a landline into a customer service platform so that customers can receive asynchronous customer service through the text channel.

In one aspect of the invention, a method for providing a customer service channel responsive to text messages forwarded from a mobile device to a dedicated customer service landline is provided. The method includes maintaining a registration of a handler system with a text hub, wherein the text hub intercepts text messages forwarded through a mobile carrier to the dedicated customer service landline. The method additionally includes receiving at the registered handler system a text message directed to the dedicated landline and processing the text message through a social media computing platform communicatively connected with the registered handler system. Processing at the social media platform includes using a subject inference component to determine a subject of the text message and calling a routing engine for forwarding the text message to a customer service platform based on the subject of the text message. Processing further includes receiving a response to the text message formulated at the customer service platform at the social media computing platform and transmitting the response from the social media platform in the form of a text message to the text hub for delivery by the mobile carrier to the mobile device.

In an additional aspect of the invention, a system provides a customer service channel responsive to text messages forwarded from a mobile device to a dedicated customer service landline. A handler system is registered with a text hub, wherein the text hub intercepts text messages forwarded through a mobile carrier to the dedicated customer service landline and the registered handler system receives the text message from the text hub. The system additionally includes a social media computing platform communicatively connected with the registered handler for processing the text message. The social media computing platform includes a text handler having request processor receiving the text message, a subject inference component determining a subject of the text message, and a routing engine for forwarding the text message to a customer service platform based on the subject of the text message. The request processor receives a response to the text message formulated at the customer service platform and transmits the response from the social media platform in the form of a text message to the text hub for delivery by the mobile carrier to the mobile device.

In an additional aspect of the invention, a computer readable medium storing code is provided, wherein the code is executed by a processor to perform multiple steps. The steps include maintaining a registration of a handler system with a text hub, wherein the text hub intercepts text messages forwarded through a mobile carrier to the dedicated customer service landline and receiving at the registered handler system a text message directed to the dedicated landline. The steps further include using text handler having a subject inference component to determine a subject of the text message and calling a routing engine for forwarding the text message to a customer service platform based on the subject of the text message. The steps additionally include receiving a response to the text message formulated at the customer service platform at the processor and transmitting the response from the processor in the form of a text message to the text hub for delivery by the mobile carrier to the mobile device.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for integrating SMS texting directed to a customer service landline number into a customer service platform. In particular, embodiments of the invention integrate SMS texting into a social media platform as a centralized function to handle all forms of asynchronous customer service. The social media software processes operate together with mobile carrier and text hub services to provide the foundation for a solution.

Figure 1:
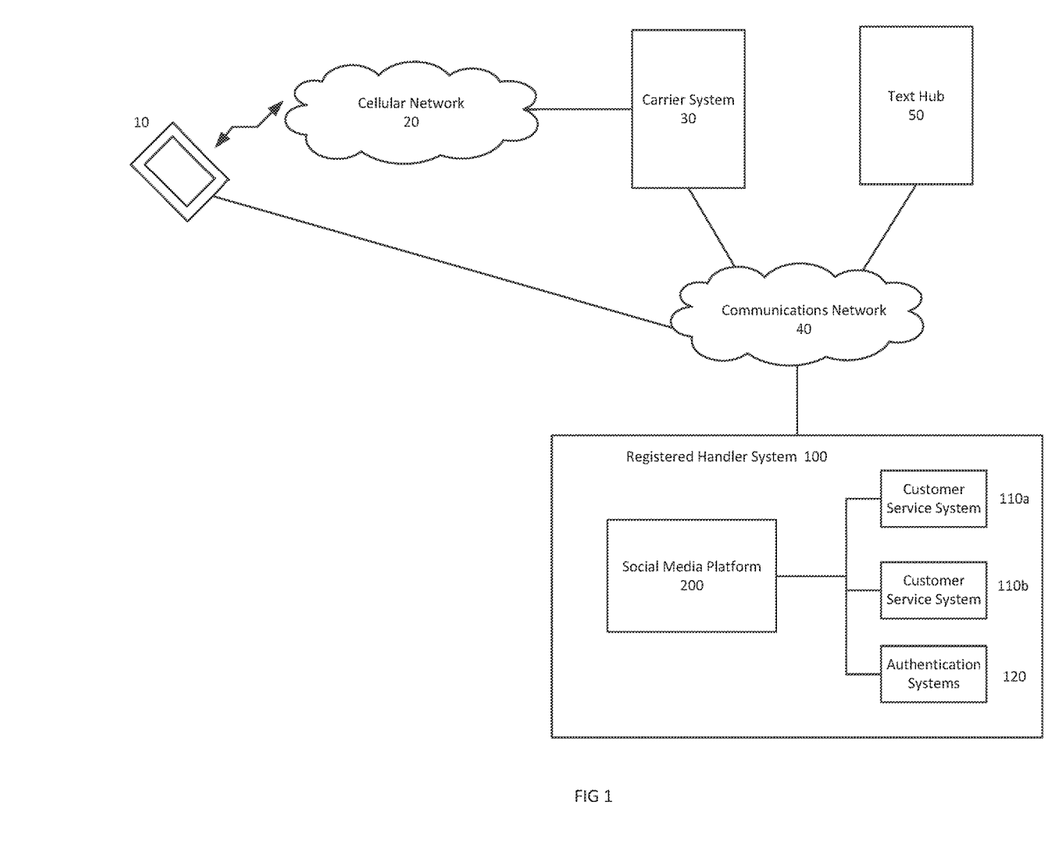
FIG. 1 is a block diagram illustrating an operating environment for a customer service texting system in accordance with an embodiment of the invention.

FIG. 1 is a block diagram illustrating an operating environment for a customer service text messaging system in accordance with an embodiment of the invention. A mobile device 10 may communicate over a cellular network 20 with a carrier system 30. The carrier system 30 may be connected over one or more communications networks with additional systems such as a text hub 50. One or more registered handler systems 100 for perpetuating text message communications may also be connected over the communications network 40. Additional systems or devices may also be present in the displayed environment.

The mobile device 10 may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These mobile devices 10 may utilize a downloadable app supplied by the registered handler system 100. The mobile device 10 may include a processor and a memory. The memory may include, for example, applications and a browser. The processor may also be connected to additional components, either stored in a memory or installed as separate hardware components, such as for example battery or power source, clock, camera, input interface, network interface, output devices, geo-locator, and operating system.

The cellular network 20 may include cellular towers operating in conjunction with a provider such as Verizon, AT&T or Sprint or other provider. A cellular network or mobile network is a communication network where the last link is wireless. The network is distributed over land areas called cells, each served by at least one fixed-location transceiver, known as a cell site or base station.

The carrier system 30 may include multiple servers including at least one processor and multiple applications executed by the processor capable of performing desired functions to interact with connected components.

The text hub 50 is a messaging service that enables companies, mobile networks operators, Internet service providers, and fixed-line operators to efficiently deliver mobile messages. Once the carrier system 30 determines that a target number is not a mobile number, it will forward the number to the text hub 50 and delegate the handling of the text to the text hub 50. Text hubs are provided for example by companies such as Syniverse™ and SAP™. In operation, the text hub 50 will look up a handler for the landline number. In some instances the text hub 50 may not find a handler and will be unable to deliver the text message, but may ensure that feedback is provided to the sender. However, the registered handler 100 registers with the text hub 50 to ensure that the look up procedures will succeed. The text hub 50 will dispatch the received SMS text message to the registered handler system 100.

The communications network 40 is preferably the Internet, but may be or include other types of networks. For example, the network 40 may include a wired or wireless local a network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Although only one communications network is shown, multiple communications networks may be utilized for communicating between the displayed components.

The registered handler system 100 may operate through a host server that administers multiple computing systems and applications for internal and external users. The host server can host web sites, files, images, games and similar content. The host server can be shared among many clients. The registered handler system 100 that perpetuates SMS text communications may include multiple servers including at least one processor and multiple applications executed by the processor capable of performing desired functions to interact with connected components The system 100 interacts with the interconnected systems to control a facilitate texting as a customer service channel. In the illustrated embodiment, the registered handler system 100 includes a social media platform 200 for handling the text communications. As illustrated, the registered handler system 100 also includes multiple customer service systems 110a, 110b, and authentication system 120.

While the system 100 is labeled as the registered handler system, a single component within the system may be registered as the handler. For example, as will be further described below, a text handler plug-in may be registered as the handler, so that re-directed texts will be routed directly to the text handler.

The customer service systems 110a, 110b may include Voice Response Units (VRU) or interactive voice response (IVR) units that facilitate the interaction between a human (typically a caller) and a computer that is programmed to respond to the human's requests. These systems involve a computer phone application that accepts touch-phone keypad selection input from the caller and provides appropriate information in the form of voice answers or a connection to a "live" operator or agent. Other types of customer service systems may also be utilized. In embodiments of the invention, the automated system can be a question tree, which is the text equivalent of an IVR system or an automated robot using artificial intelligence to provide human-like responses. The customer service systems 110 may be automated systems or may be attended by customer service agents. In either case, the social media platform, such as for example, Sprinklr™ may run on the customer service computing system.

The authentication systems 120 may include one or more systems that facilitate authentication of customers. The authentication systems may incorporate various types of authentications based on user activities. Authentication requirements may include, for example, biometric requirements, challenge questions, usernames and passwords, and other known authentication mechanisms. While the authentication systems 120 are shown as separate from and communicating with the social media platform 200, authentication systems may be incorporated in the social media platform 200.

Figure 2:
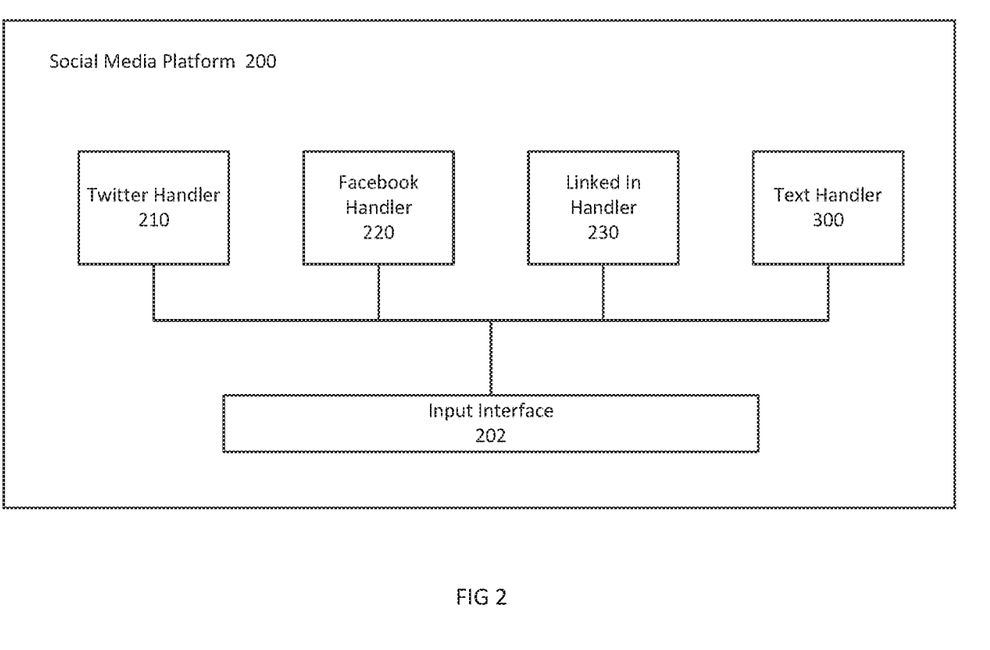
FIG. 2 is a block diagram illustrating a social media platform for operating within the customer service texting system in accordance with an embodiment of the invention.

FIG. 2 is a block diagram illustrating the social media platform 200. The social media platform 200 may include multiple software modules executed by one or more processors of the social media platform for handling different types of social media communications. For example, a Twitter® handler 210, a Facebook® handler 220, a LinkedIn® Handler 230, and a text handler 300 may all be included. Additional plug-ins may be added to handle different types of communications such as email, online chat, etc. Communications may arrive through an input interface 202 and be directed to an appropriate handler by the input interface 202. The social media handler 200 may build upon an existing social media platform such as the Sprinklr™ platform. The addition of the text handler 300 leverages the existing ability of the platform to route requests to agents or automated customer service platforms, track and respond to asynchronous messages from customers, and perform sentiment analysis. Alternatively, the social media platform 200 may include a unified contact center platform that handles multiple communication channels including both point-to-point and social channels. The platform could support voice, email, SMS, chat, and other channels.

Figure 3:
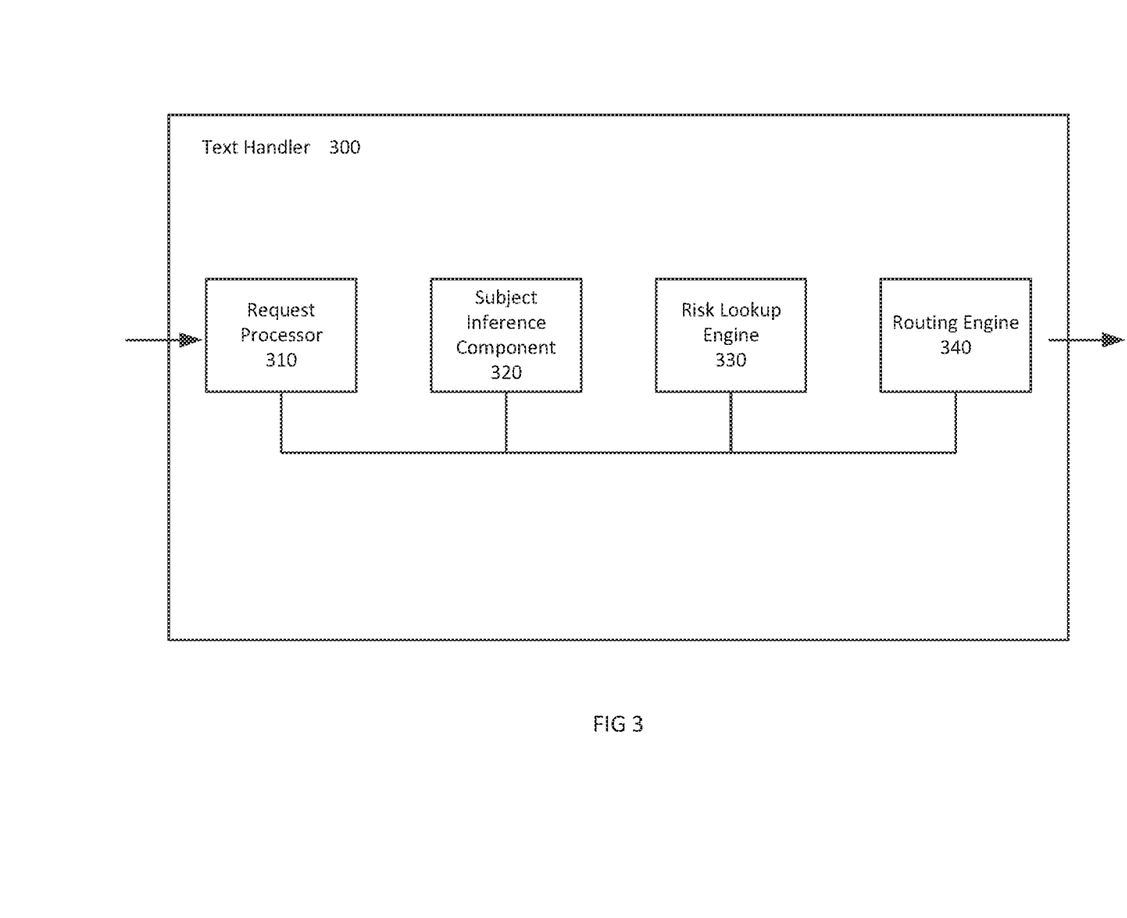
FIG. 3 is a block diagram of a text handler of the social media platform in accordance with an embodiment of the present invention.

FIG. 3 is a block diagram illustrating the text handler 300 in accordance with an embodiment of the invention. The text handler 300 includes multiple software components including a request processor 310, a subject inference component 320, a risk lookup engine 330, and a routing engine 340.

The request processor 310 may receive the SMS text message through the input interface from the text hub 50 and operate on the text to determine if the text has a request ID so that it can be chained with other related texts in order to enhance customer service. If the request does not have a request ID, the request processor 310 may generate a request ID and append it to the request so that future correspondence regarding the same issue with the same customer will have the same request ID and will be chained with the original request.

The subject inference component 320 may determine the subject matter of the text message so that it can be routed to the appropriate customer service platform for handling. For example, in the case of a banking customer, the subjects may include online bill payment questions, requests to transfer funds, requests to cancel a credit card, etc. These requests with respect to different topics are likely to be handled by different customer service systems. In embodiments of the invention, the subject inference component may use natural language processing (NLP) to determine a subject so that the request can be routed to an appropriate customer service agent or automated customer service system. In embodiments of the invention, the automated system can be a question tree, which is the text equivalent of an IVR system or an automated robot using artificial intelligence to provide human-like responses.

The risk lookup engine 330 may look up or assess risk with respect to a request. The engine may access a database to determine a level of risk associated with a particular activity. The SMS text channel will support low risk and high risk levels of authentication. For low risk authentication, the SMS channel may provide an authentication mechanism or interact with an authentication system shown to ask the customer the same questions that are currently asked in an IVR channel (e.g. mother's maiden name, home zip code, etc.) Once verified, the customer will be able to fulfill the request through the text channel. In embodiments of the invention, the text channel may have a pre-determined risk threshold. If the request requires a risk level exceeding that threshold, the risk lookup engine 330 may determine that the request cannot be handled through the text channel and will transition the request to another channel. For example, for high risk authentication, the text handler may route the customer to an HTML5 app, a native mobile app, or a voice call where different authentication mechanisms are supported. Alternatively, if the risk level for the request is below the pre-determined threshold, the system may continue to handle the request through the text channel.

When the risk lookup engine 330 finds a high level of risk and re-routes the requester to the HTML5 or native mobile apps, the customer will be required to use existing strong methods of transport level security authentication (e.g. https). For a transition to a voice channel, an IVR may ask the customer for more sensitive personally identifiable information such as social security number. Accordingly, the customer is not required to leave sensitive personally identifiable information an SMS message stream of the text channel. Because SMS does not enforce message deletion, high risk results from retaining personally identifiable information in the SMS stream. Thus, customers initiating a request on the SMS text channel are able to complete the request through a different channel if a high risk level is involved.

The routing engine 340 routes request based on the above-described criteria. For example, if a request ID is present in the request, the routing engine 340 may route the request based on the request ID so that the request is handled by the same customer service platform as previous requests chained by virtue of the request ID. Alternatively, the routing engine 340 may route the request to a customer service platform based on the subject inferred by the subject inference component. In embodiments of the invention, the routing engine 340 executes redirection of the customer to alternate channels when the security required exceeds the predetermined threshold. For example, the routing engine 340 may send a URL via text message through the text hub allowing the customer to download a mobile app or alternatively, send a URL that will activate a mobile app that the customer has already downloaded. The downloadable applications preferably include a downloadable mobile app for use by the customer. The mobile app is downloadable over the Internet via a network interface to the mobile devices as described above. Once downloaded, the downloadable mobile application may operate on the user mobile devices to interact with the registered handler system.

Thus, the routing engine 340 may generate a unique URL containing an activation link and may send an alert to the mobile device including the URL, wherein selection of the URL will open the mobile app on the mobile device and allow the subscriber to enter a new customer service channel. This alert can be received by the mobile device when the user is offline and bring the user online through selection of the uniquely generated URL.

Figure 4:
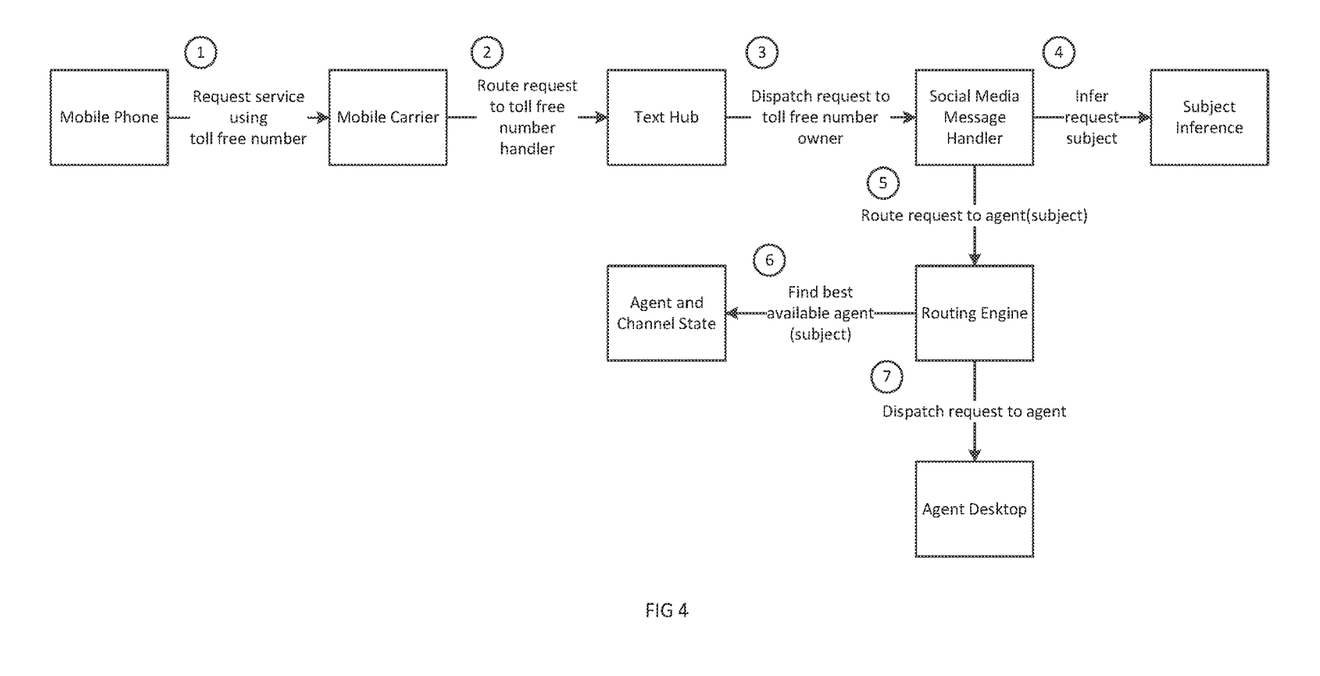
FIG. 4 is a work flow diagram illustrating interactions various components of the customer service texting system upon receipt of a text directed to a customer service landline in accordance with an embodiment of the invention.

FIG. 4 is a work flow diagram illustrating interactions between various components of the customer service texting system upon receipt of a text directed to a toll free customer service landline in accordance with an embodiment of the invention. A mobile phone requests service using a toll free landline number at step 1. The mobile carrier handling the request determines that the number is a landline and is thus unable to receive a text message and routes the request to a text hub in step 2. The text hub looks for a registered handler associated with the toll free landline number and dispatches the text to the registered handler in step 3. If no registered handler is located, the text will not be delivered. In the instant case, the registered handler is found and the social media text handler receives the message at step 3. The text handler infers the subject and step 4 and routes the request to an agent or automated bot or system in step 5. The routing engine of the text handler may take further steps to find a best available agent or system in step 6 by determining agent states. For example, the routing engine may determine if the agent or system is busy and whether a wait time is required. The routing engine may then dispatch the request to the agent or system based on both qualification and availability in step 7.

Figure 5:
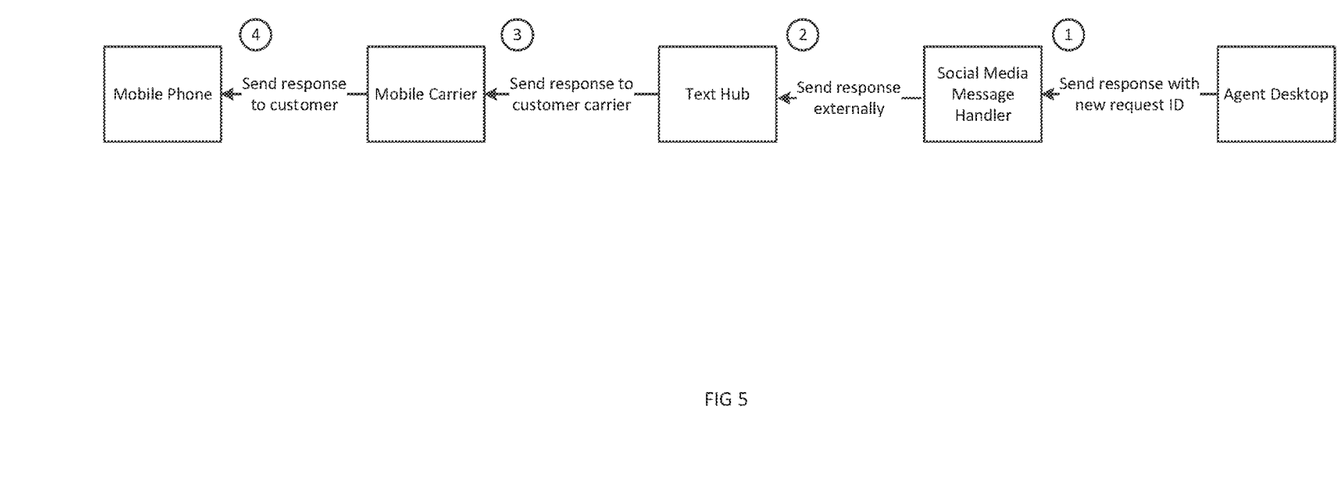
FIG. 5 is a work flow diagram illustrating operation of components of a customer service texting system responding to a received text in accordance with embodiment of the present invention.

FIG. 5 is a work flow diagram illustrating operation of components of a customer service texting system responding to a received text message in accordance with an embodiment of the present invention. In step 1, the agent or automated system sends a formulated response with the request ID to the text handler. The text handler then sends the response in the text message format externally in step 2 to the text hub. In step 3, the text hub sends the response to the customer carrier and in step 4, the mobile carrier sends the response over the carrier network to the customer mobile device.

Figure 6:
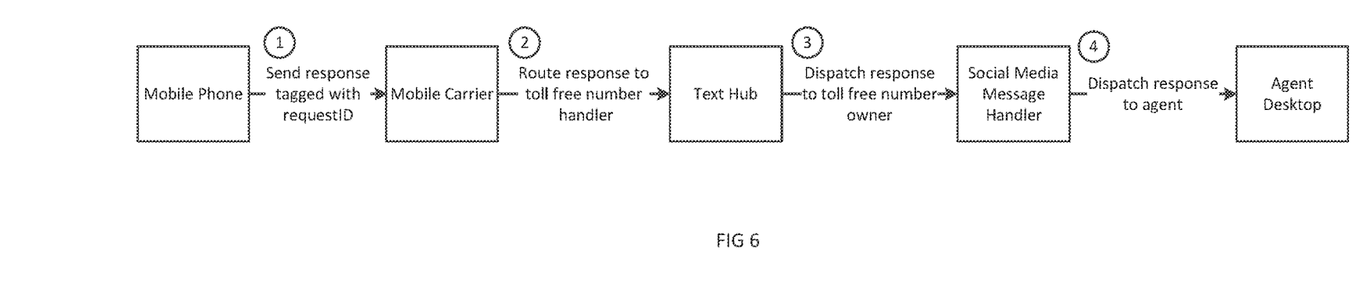
FIG. 6 is a work flow diagram illustrating operation of components of the customer service texting system upon receipt of a customer response to a customer service system text message.

FIG. 6 is a work flow diagram illustrating operation of components of the customer service texting system upon receipt of a customer response to a customer service system text message. In step 1, the customer mobile device sends the response tagged with the request ID to the mobile carrier. In step 2, the mobile carrier determines that the text message is directed to a landline and routes the request to the text hub. In step 3, the text hub determines the registered handler for the landline and routes the response to the registered handler system. In step 4, The text handler dispatches the response to the agent or automated customer service system based on the request ID.

Figure 7:
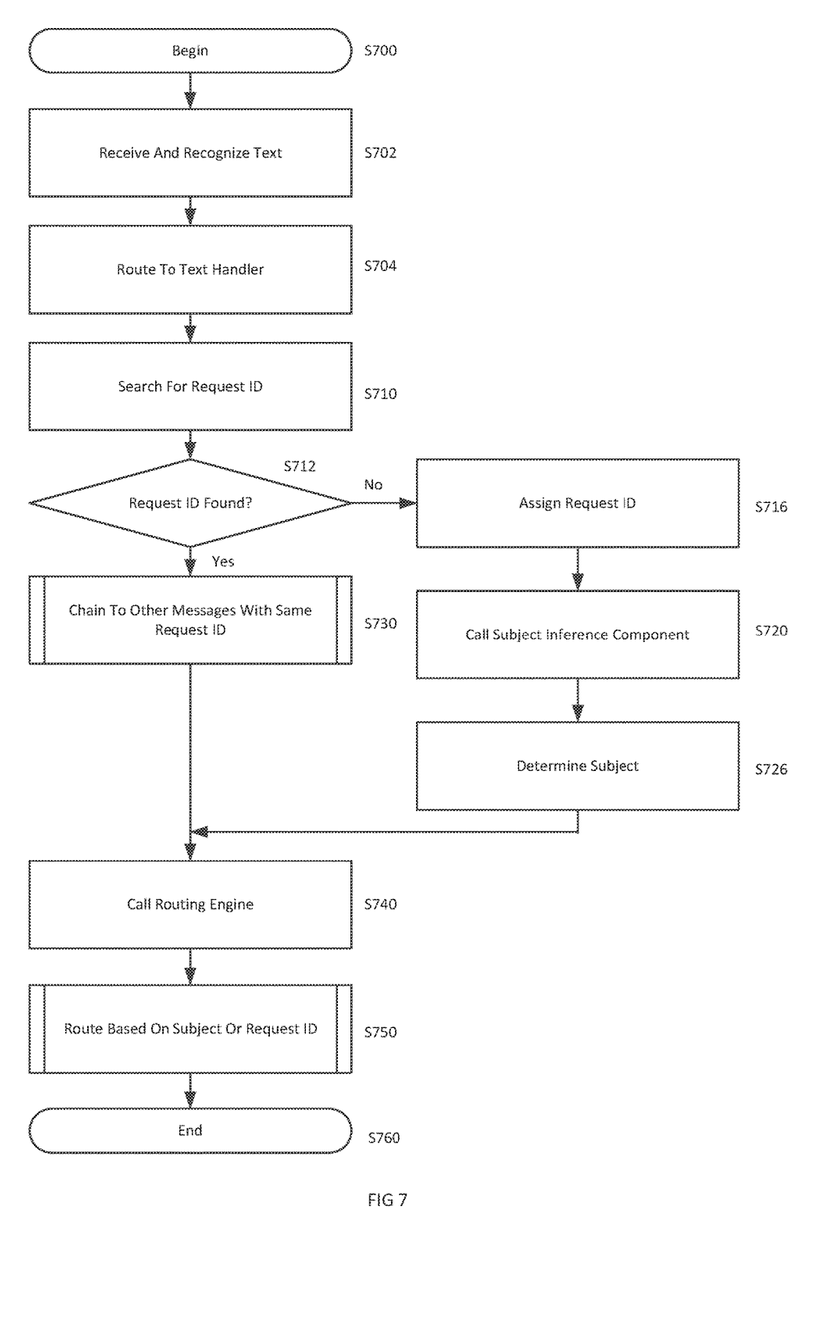
FIG. 7 is a flow chart illustrating a process for handling an incoming text message in accordance with an embodiment of the invention.

FIG. 7 is a flow chart illustrating a process for handling an incoming text message in accordance with an embodiment of the invention. The method illustrated in FIG. 7 may be used on an incoming text regardless of whether it is the first request or a subsequent request already having an assigned request ID. The method begins in S700 and text is received and recognized at S702. At S704, the text is routed to the text handler. In S710, the text handler searches for the request ID.

If the request ID is not found in S712, the system assigns a request ID in S716 and calls a subject inference component in S720. The subject inference component determines a subject of the request in S726.

If the request ID is found in S712, the text handler chains the text to other texts with the same request ID in S730.

In S740, the text handler calls the routing engine and the routing engine routes based on subject or request ID in S750. As set forth above, the routing engine may also route the text based on agent or system availability and qualifications.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A method for providing a customer service channel responsive to text messages forwarded from a mobile device to a dedicated customer service landline, the method comprising:
   receiving, a text message forwarded from a mobile device to a dedicated customer service landline;
   processing the text message, the processing including:
      determining a risk level associated with a service requested by the text message and determining a relationship of the risk level to a pre-selected threshold;
      transitioning the customer to a different channel for authentication when the relationship indicates that the risk level exceeds the pre-selected threshold;
      determine a subject of the text message using a subject inference component;
      identifying when one or more of a plurality of customer service platforms associated with the received text message based on the determined subject of the text message;
      forwarding the text message to the one or more of the plurality of customer service platforms when the identification indicates that the one or more of the plurality of customer service platforms are associated with the received text message;
      receiving a response to the text message formulated at one of the plurality of customer service platforms; and
      transmitting the response in the form of another text message to the text hub for delivery by a mobile carrier to the mobile device.

2. The method of claim 1, further comprising determining when one or more of the plurality of customer service platforms is in a wait state upon identifying the one or more of the plurality of customer service platforms associated with the received text message.

3. The method of claim 2, further comprising forwarding the text message to the one or more of the plurality of customer service platforms when the determination indicates that the one or more of the plurality of customer service platforms are not in the wait state.

4. The method of claim 3, further comprising transitioning the customer to the different channel by forwarding a text message containing a link for downloading a mobile application.

5. The method of claim 3, further comprising transitioning the customer to the different channel by forwarding the text message to an interactive voice response unit for making voice contact with the customer.

6. The method of claim 1, further comprising determining whether the text message has a request identifier.

7. The method of claim 6, further comprising assigning a request identifier when the text message does not have a request identifier.

8. The method of claim 7, further comprising linking received text messages into a chain when the text messages have a matching request identifier.

9. A system comprising, one or more handler systems, dedicated customer service landline, authentication systems, social media computing platforms, the system comprising a memory, the memory comprising programmed instructions stored thereon and one or more processors configured to be capable of executing the stored programmed instructions to:
   receive, from a text hub, a text message forwarded from a mobile device to a dedicated customer service landline;
   process the text message, the processing includes;
      determine a risk level associated with a service requested by the text message and determining a relationship of the risk level to a pre-selected threshold;
      transition the customer to a different channel for authentication when the relationship indicates that the risk level exceeds the pre-selected threshold;
      determine a subject of the text message using a subject inference component:
      forward the text message to one of a plurality of customer service platforms based on the subject of the text message:
      receive a response to the text message formulated to one of the plurality of customer service platforms; and
      transmit the response in the form of another text message to the text hub for delivery by a mobile carrier to the mobile device.

10. The system of claim 9, wherein the one or more processors are further configured to be capable of executing the stored programmed instructions to determine when one or more of the plurality of customer service platforms is in a wait state upon identifying the one or more of the plurality of customer service platforms associated with the received text message.

11. The system of claim 10, wherein the one or more processors are further configured to be capable of executing the stored programmed instructions to forward the text message to the one or more of the plurality of customer service platforms when the determination indicates that the one or more of the plurality of customer service platforms are not in the wait state.

12. The system of claim 11, wherein the one or more processors are further configured to be capable of executing the stored programmed instructions to transition the customer to the different channel by forwarding a text message containing a link for downloading a mobile application.

13. The system of claim 11, wherein the one or more processors are further configured to be capable of executing the stored programmed instructions to transition the customer to the different channel by forwarding the text message to an interactive voice response unit for making voice contact with the customer.

14. The system of claim 9, wherein the one or more processors are further configured to be capable of executing the stored programmed instructions to determine whether the text message has a request identifier.

15. The system of claim 14, wherein the one or more processors are further configured to be capable of executing the stored programmed instructions to assign a request identifier when the text message does not have a request identifier.

16. The system of claim 15, wherein the one or more processors are further configured to be capable of executing the stored programmed instructions to link the received text messages into a chain when the text messages have a matching request identifier.

17. A non-transitory computer readable medium having stored thereon instructions for providing a customer service channel responsive to text messages forwarded from a mobile device to a dedicated customer service landline comprising executable code which when executed by one or more processors, causes the one or more processors to:
receive, from a text hub, a text message from a mobile device directed to a dedicated customer service landline;
process the text message, the processing includes;
determine a risk level associated with a service requested by the text message and determining a relationship of the risk level to a pre-selected threshold;
transition the customer to a different channel for authentication when the relationship indicates that the risk level exceeds the pre-selected threshold;
determine a subject of the text message using a subject inference component;
forward the text message to one of a plurality of customer service platforms based on the subject of the text message,
receive a response to the text message formulated at one of the plurality of customer service platforms; and
transmit the response in the form of another text message to the text hub for delivery by a mobile carrier to the mobile device.

18. The non-transitory computer readable medium of claim 17, wherein the executable code when executed by the one or more processors further causes the one or more processors to:
determine when one or more of the plurality of customer service platforms is in a wait state upon identifying the one or more of the plurality of customer service platforms associated with the received text message; and
forward the text message to the one or more of the plurality of customer service platforms when the determination indicates that the one or more of the plurality of customer service platforms are not in the wait state.

19. The non-transitory computer readable medium of claim 18, wherein the executable code when executed by the one or more processors further causes the one or more processors to: further comprising transitioning the customer to a different channel for authentication when the risk level exceeds the pre-selected threshold.

20. The non-transitory computer readable medium of claim 19, wherein the executable code when executed by the one or more processors further causes the one or more processors to: transition the customer to the different channel by forwarding a text message containing a link for downloading a mobile application.

* * * * *